(12) United States Patent
Shi et al.

(10) Patent No.: US 10,608,842 B2
(45) Date of Patent: Mar. 31, 2020

(54) GTP-U DOWNLINK PACKET SENDING METHOD AND APPARATUS

(71) Applicant: Huawei Technologies Co., Ltd., Shenzhen, Guangdong (CN)

(72) Inventors: Xiaoyan Shi, Shenzhen (CN); Chunshan Xiong, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/897,589

(22) Filed: Feb. 15, 2018

(65) Prior Publication Data

US 2018/0176039 A1     Jun. 21, 2018

Related U.S. Application Data

(63) Continuation of application No. PCT/CN2015/087238, filed on Aug. 17, 2015.

(51) Int. Cl.
*H04L 12/46* (2006.01)
*H04W 4/18* (2009.01)
(Continued)

(52) U.S. Cl.
CPC ...... *H04L 12/4633* (2013.01); *H04L 61/1588* (2013.01); *H04W 4/18* (2013.01); *H04W 36/0033* (2013.01); *H04W 76/11* (2018.02); *H04W 76/12* (2018.02); *H04W 80/04* (2013.01); *H04L 2212/00* (2013.01); *H04W 8/10* (2013.01);
(Continued)

(58) Field of Classification Search
CPC ............ H04L 12/4633; H04L 61/1588; H04L 2212/00; H04W 36/0033; H04W 76/12; H04W 80/04; H04W 76/11; H04W 4/18; H04W 8/26; H04W 8/10; H04W 92/12; H04W 92/14
See application file for complete search history.

(56) References Cited

U.S. PATENT DOCUMENTS

2014/0064246 A1   3/2014   Baillargeon
2014/0079049 A1   3/2014   Friman et al.
(Continued)

FOREIGN PATENT DOCUMENTS

CN   101540719 A   9/2009
CN   103477665 A   12/2013
(Continued)

*Primary Examiner* — Zhensheng Zhang
(74) *Attorney, Agent, or Firm* — Slater Matsil, LLP

(57) ABSTRACT

Embodiments of the present disclosure provide a GTP-U downlink packet sending method and apparatus. The method includes: receiving, by a MEC platform, a GTP-U uplink packet sent by a base station device; obtaining, by the MEC platform, a TEID of the base station device according to the GTP-U uplink packet; and sending, by the MEC platform, a GTP-U downlink packet to the base station device, where the GTP-U downlink packet includes the TEID of the base station device. By using the technical solutions of the embodiments of the present disclosure, after receiving the GTP-U uplink packet sent by the base station device, the MEC platform can obtain the TEID of the base station device according to the GTP-U uplink packet, and therefore, can correctly perform GTP-U encapsulation, and send the GTP-U downlink packet to the base station device.

8 Claims, 8 Drawing Sheets

(51) Int. Cl.
*H04W 80/04* (2009.01)
*H04W 76/12* (2018.01)
*H04W 76/11* (2018.01)
*H04L 29/12* (2006.01)
*H04W 36/00* (2009.01)
*H04W 92/12* (2009.01)
*H04W 92/14* (2009.01)
*H04W 8/10* (2009.01)
*H04W 8/26* (2009.01)

(52) U.S. Cl.
CPC .............. *H04W 8/26* (2013.01); *H04W 92/12* (2013.01); *H04W 92/14* (2013.01)

(56) References Cited

U.S. PATENT DOCUMENTS

| | | |
|---|---|---|
| 2014/0376559 A1 | 12/2014 | Diwane et al. |
| 2015/0063113 A1* | 3/2015 | Yoshida .................. H04L 45/38 370/235 |
| 2015/0131618 A1 | 5/2015 | Chen |
| 2015/0223284 A1 | 8/2015 | Jain et al. |
| 2016/0374126 A1 | 12/2016 | Ejzak et al. |

FOREIGN PATENT DOCUMENTS

| | | |
|---|---|---|
| CN | 104737619 A | 6/2015 |
| EP | 2901810 A1 | 8/2015 |
| KR | 20150036300 A | 4/2015 |
| WO | 2013166640 A1 | 11/2013 |
| WO | 2014052877 A1 | 4/2014 |

* cited by examiner

GTP-U DOWNLINK PACKET SENDING METHOD AND APPARATUS

CROSS-REFERENCE TO RELATED APPLICATIONS

This application is a continuation of International Application No. PCT/CN2015/087238, filed on Aug. 17, 2015, the disclosure of which is hereby incorporated by reference in its entirety.

TECHNICAL FIELD

The present application relates to communications technologies, and in particular, to a general packet radio system (GPRS) tunneling protocol-user plane (GTP-U) downlink packet sending method and apparatus.

BACKGROUND

To deal with challenges of wireless broadband technologies, and maintain the leading edge of the 3rd Generation Partnership Project (3GPP) network, the 3GPP has formulated a Long Term Evolution (LTE) plan of a mobile communications network. Under the guidance of the LTE plan, the 3GPP has defined a new mobile communications network architecture, that is, an evolved packet system (EPS) wireless network architecture.

FIG. 1 is a schematic diagram of an EPS wireless network architecture in the prior art. As shown in FIG. 1, when user equipment (UE) accesses an EPS network by using a serving GPRS support node (SGSN), the UE may access a serving gateway (SGW) by using an S4 interface, and then, access a packet data network gateway (PDN-GW or PGW) by using an S5 interface. Functions of main network entities in the EPS network are described as follows:

An evolved universal terrestrial radio access network (E-UTRAN) is a network including multiple evolved NodeBs (eNodeB), and implements a wireless physical layer function, resource scheduling and radio resource management, and a radio access control and mobility management function. The eNodeBs are connected to an SGW by using a user plane interface (S1-U interface), and are configured to transmit user data; and are connected to a mobility management entity (MME) by using a control plane interface (S1-MME interface), and are configured to implement a radio access bearer control function by using an S1 Application Protocol (S1-AP).

The MME is mainly responsible for functions such as mobility management of the UE, session management, encryption and integrity protection of non-access stratum (NAS) signaling, management of a tracking area list (Tracking Area List), and PGW/SGW selection.

An SGW is mainly responsible for data transmission, forwarding, and route switching of the UE, and is used as a local mobility anchor when the UE is handed over between eNodeBs.

A PGW is an entry for an external network to send data to the UE, and is mainly responsible for IP address assignment of the UE, data packet filtering, rate control, charging information generation, and the like.

A policy and charging rules function (PCRF) entity determines a corresponding policy according to a network access limitation of a user, an operator policy, user subscription data, and information about a service that is being performed by the user, and provides the policy to a transmission gateway for execution, to implement policy and charging control.

Operator's IP services (Operator's IP Services) are implemented in the LTE network by using an IP multimedia subsystem (IMS) network. In addition, a packet switched streaming service (PSS) technology is a technology defined by the 3GPP and used to provide a streaming media service to a user. A PSS network architecture mainly includes a mobile terminal and a PSS server on a network side.

Data packets sent and received by the UE are transmitted in the EPS network by using an EPS bearer. For the convenience of description, the EPS bearer may also be referred to as a bearer in the following specification. Each UE may have multiple bearers, and different bearers can satisfy quality of service (QoS) requirements of different services. An eNodeB and an SGW may store information about each bearer, that is, a bearer context. The bearer context includes an SGW tunneling endpoint identifier (TEID) and an eNodeB TEID of each bearer. The SGW TEID is used for an uplink packet sent by the eNodeB to the SGW and the eNodeB TEID is used for a downlink packet sent by the SGW to the eNodeB. The eNodeB implements bearer context synchronization with an MME by using an S1-AP message, and the SGW implements bearer context synchronization with the MME by using a GPRS tunneling protocol-control plane (GTP-C) message, thereby implementing bearer context synchronization between the eNodeB and the SGW.

When receiving an uplink packet sent by the UE, the eNodeB may encapsulate the uplink packet of the UE into a GTP-U packet according to the bearer context. The GTP-U packet includes a GTP-U header, and the GTP-U header includes an SGW TEID. Because different bearers may use different SGW TEIDs, when receiving the GTP-U packet sent by the eNodeB, the SGW may determine, according to the GTP-U header, a bearer to which the GTP-U packet belongs. Similarly, when receiving a downlink packet sent to the UE, the SGW encapsulates the packet of the UE into a GTP-U packet. The GTP-U packet includes a GTP-U header, and the GTP-U header includes an eNodeB TEID. Therefore, when receiving the GTP-U packet sent by the SGW, the eNodeB can determine, according to the GTP-U header, a bearer to which the GTP-U packet belongs.

A mobile edge computing (MEC) platform is a logic network element deployed on the S1-U interface, and is located between the eNodeB and the SGW. The MEC platform mainly includes a traffic bus (traffic bus) and an application (application). The traffic bus is responsible for obtaining a data packet of the UE and forwarding the data packet to a corresponding application. After processing the data packet, the application sends the processed data packet to the traffic bus for routing.

Multiple types of applications may be installed on the MEC platform, to improve service experience of the user. The application on the MEC platform may capture an uplink packet sent by the UE, and modify, check, and forward the uplink packet of the UE, or may directly reply to the uplink packet sent by the UE. For example, a video buffering application may be installed on the MEC platform. When the UE sends a video request packet, the video buffering application processes the video request packet of the UE. If the video buffering application does not include a video requested by the UE, the video buffering application may forward the video request packet of the user to the SGW, or if the video buffering application stores a video requested by the UE, the video buffering application directly sends a video reply packet to the UE.

The applicants find that when the MEC platform directly replies to the uplink packet of the UE, the MEC platform cannot correctly perform GTP-U encapsulation, and consequently, cannot send a reply packet corresponding to the uplink packet of the UE to the eNodeB.

SUMMARY

Embodiments of the present disclosure provide a GTP-U downlink packet sending method and apparatus, to resolve a problem that when an MEC platform directly replies to an uplink packet of UE, the MEC platform cannot correctly perform GTP-U encapsulation, and consequently, cannot send a reply packet corresponding to the uplink packet of the UE to an eNodeB.

A first aspect provides a GTP-U downlink packet sending method, including:

receiving, by a mobile edge computing (MEC) platform, a GTP-U uplink packet sent by a base station device;

obtaining, by the MEC platform, a tunneling endpoint identifier (TEID) of the base station device according to the GTP-U uplink packet; and sending, by the MEC platform, a GTP-U downlink packet to the base station device, where the GTP-U downlink packet includes the TEID of the base station device.

A second aspect provides a GTP-U downlink packet sending apparatus, including a network interface and a processor, where the network interface is configured to receive a GTP-U uplink packet sent by a base station device;

the processor is configured to obtain a tunneling endpoint identifier (TEID) of the base station device according to the GTP-U uplink packet; and the network interface is further configured to send a GTP-U downlink packet to the base station device, where the GTP-U downlink packet includes the TEID of the base station device.

In the embodiments of the present disclosure, after receiving the GTP-U uplink packet sent by the base station device, the MEC platform can obtain the TEID of the base station device according to the GTP-U uplink packet, and therefore, can correctly perform GTP-U encapsulation, and send the GTP-U downlink packet to the base station device.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
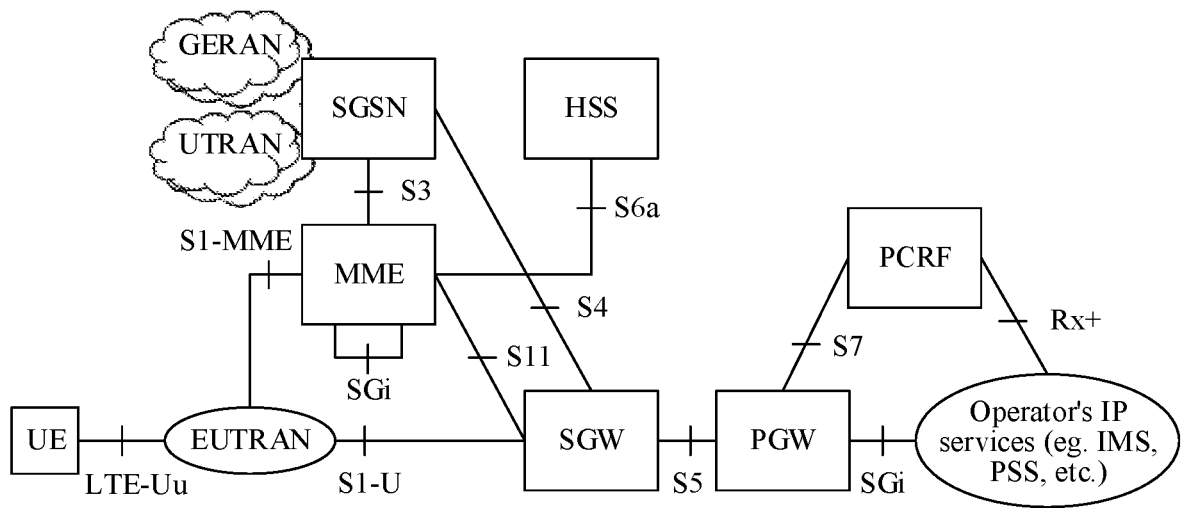
FIG. 1 is a schematic diagram of an EPS wireless network architecture in the prior art.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

A communications system used in the embodiments of the present disclosure may be the second generation (2G) mobile communications system such as a Global System for Mobile Communications (GSM), or the third generation (3G) mobile communications system such as a Universal Mobile Telecommunications System (UMTS), or the fourth generation (4G) mobile communications system such as a Long Term Evolution (LTE) system. Optionally, the communications system used in the embodiments of the present disclosure may alternatively be a next-generation mobile communications system such as the fifth generation (5G) mobile communications system.

UE used in the embodiments of the present disclosure may be a wireless terminal. The wireless terminal may be a device providing voice or data connectivity to a user, a handheld device having a wireless connection function, or another processing device connected to a wireless modem. The wireless terminal may communicate with one or more core networks by using a radio access network (RAN). The wireless terminal may be a mobile terminal such as a mobile phone (or referred to as a "cellular" phone), or may be a computer having a mobile terminal such as a portable, pocket-sized, handheld, computer built-in, or in-vehicle mobile apparatus. The wireless terminal exchanges voice or data with the radio access network. For example, the wireless terminal may be a device such as a personal communication service (PCS) phone, a cordless phone, a Session Initiation Protocol (SIP) phone, a Wireless Local Loop (WLL) station, or a personal digital assistant (PDA). The wireless terminal may also be referred to as a system, a subscriber unit, a subscriber station, a mobile station, a mobile, a remote station, an access point (AP), a remote terminal, an access terminal, a user terminal, or a user agent.

A base station device used in the embodiments of the present disclosure may be a base transceiver station (BTS)

in the GSM system, or may be a NodeB in the UMTS system, or may be an evolved NodeB (eNodeB) in the LTE system. It should be understood that the base station device in the embodiments of the present disclosure not only includes a base station device in an existing communications system, but also includes a base station device in a possible communications system in the future. This is not limited in the embodiments of the present disclosure.

Figure 2:
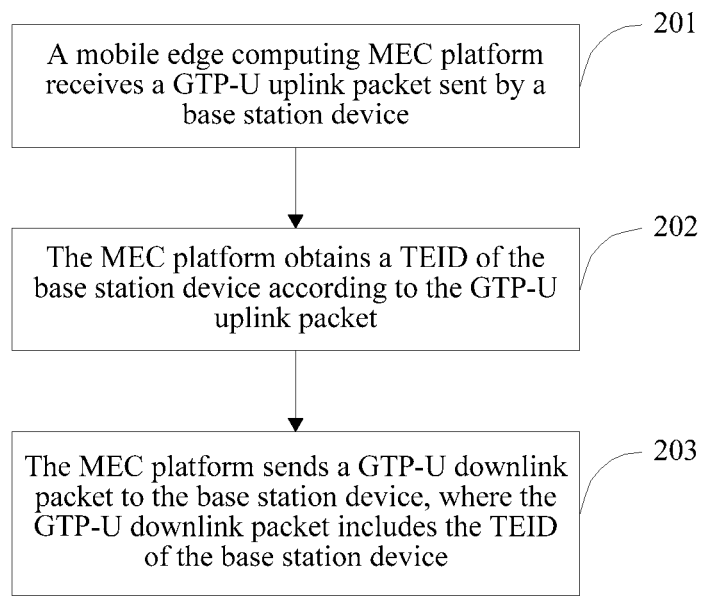
FIG. 2 is a flowchart of a GTP-U downlink packet sending method according to a first embodiment of the present disclosure.

FIG. 2 is a flowchart of a GTP-U downlink packet sending method according to a first embodiment of the present disclosure. As shown in FIG. 2, the method in this embodiment includes the following steps.

201. A mobile edge computing (MEC) platform receives a GTP-U uplink packet sent by a base station device.

Optionally, the GTP-U uplink packet includes an uplink data packet sent by UE and a bearer context of the UE. The uplink data packet includes an Internet Protocol (IP) address of the UE. For example, the uplink data packet includes an IP header, and a source address in the IP header is the IP address of the UE.

Optionally, the MEC platform includes a traffic bus, and the traffic bus receives the GTP-U uplink packet sent by the base station device.

Optionally, after receiving the GTP-U uplink packet sent by the base station device, the MEC platform further generates, according to the GTP-U uplink packet, a downlink data packet needing to be sent to the UE.

Optionally, the MEC platform further includes an application, and the application generates the downlink data packet according to the GTP-U uplink packet.

Optionally, after decapsulating the GTP-U uplink packet, the traffic bus sends the decapsulated GTP-U uplink packet to the application. The application generates the downlink data packet according to the decapsulated GTP-U uplink packet.

202. The MEC platform obtains a TEID of the base station device according to the GTP-U uplink packet.

Optionally, the MEC platform may obtain the TEID of the base station device according to the GTP-U uplink packet in one of the following several manners.

Manner 1

The MEC platform generates a first IP packet according to the GTP-U uplink packet. The first IP packet includes the IP address of the UE. Optionally, a destination address in an IP header of the first IP packet is the IP address of the UE. Optionally, the application generates the first IP packet according to the GTP-U uplink packet. Optionally, after decapsulating the GTP-U uplink packet, the traffic bus sends the decapsulated GTP-U uplink packet to the application. The application generates the first IP packet according to the decapsulated GTP-U uplink packet. The first IP packet may be the downlink data packet needing to be sent to the UE, or may be a packet whose payload is empty, or may be a packet including an identifier of the MEC platform.

The MEC platform sends the first IP packet to an IP network. After the first IP packet is sent to the IP network, the first IP packet is routed to a packet data network gateway (PGW) based on the IP address of the UE, so that the PGW sends a packet in a first GTP-U format to a serving gateway (SGW). The packet in the first GTP-U format includes the first IP packet. Optionally, the traffic bus sends the first IP packet to the IP network. Optionally, the first IP packet further includes the bearer context of the UE. After the first IP packet is routed to the PGW, the PGW encapsulates the first IP packet into the packet in the first GTP-U format according to the bearer context of the UE. The packet in the first GTP-U format includes an SGW TEID. The SGW TEID is used for the PGW to send the packet in the first GTP-U format to the SGW.

The MEC platform receives a packet in a second GTP-U format sent by the SGW. The packet in the second GTP-U format is generated by the SGW according to the packet in the first GTP-U format, and the packet in the second GTP-U format includes the first IP packet and the TEID of the base station device. Optionally, the traffic bus receives the packet in the second GTP-U format sent by the SGW. Optionally, after receiving the packet in the first GTP-U format sent by the PGW, the SGW decapsulates the packet in the first GTP-U format, and removes the SGW TEID, to obtain the first IP packet. The SGW generates the packet in the second GTP-U format according to the first IP packet. Optionally, the SGW encapsulates the first IP packet into the packet in the second GTP-U format according to the bearer context of the UE in the first IP packet. A GTP-U header of the packet in the second GTP-U format includes the TEID of the base station device of the bearer.

The MEC platform obtains the TEID of the base station device according to the packet in the second GTP-U format. Optionally, the traffic bus obtains the TEID of the base station device according to the packet in the second GTP-U format.

In this manner, another device other than the MEC platform does not need to be upgraded, and it is not required to deploy a server device. It is compatible with an existing device. Therefore, a deployment speed is relatively fast, and costs are relatively low.

Manner 2

The MEC platform generates a second IP packet according to the GTP-U uplink packet. The second IP packet includes the IP address of the UE. For example, a destination address in an IP header of the second IP packet is the IP address of the UE. Optionally, the application generates the second IP packet according to the GTP-U uplink packet. Optionally, after decapsulating the GTP-U uplink packet, the traffic bus sends the decapsulated GTP-U uplink packet to the application. The application generates the second IP packet according to the decapsulated GTP-U uplink packet. The second IP packet may be a packet whose payload is empty, or may be a packet including an identifier of the MEC platform.

The MEC platform sends the second IP packet to a server by using an SGW and a PGW, so that after generating a response packet according to the second IP packet, the server sends the response packet to the PGW, and the PGW sends a packet in a third GTP-U format to the SGW. The packet in the third GTP-U format includes the response packet. Optionally, the traffic bus sends the second IP packet to the server by using the SGW and the PGW. Optionally, the response packet includes a bearer context of the UE. After receiving the response packet, the PGW encapsulates the response packet into the packet in the third GTP-U format according to the bearer context of the UE. The packet in the third GTP-U format includes an SGW TEID. The SGW TEID is used for the PGW to send the packet in the third GTP-U format to the SGW.

The MEC platform receives a packet in a fourth GTP-U format sent by the SGW. The packet in the fourth GTP-U format is generated by the SGW according to the packet in the third GTP-U format, and the packet in the fourth GTP-U format includes the response packet and the TEID of the base station device. Optionally, the traffic bus receives the packet in the fourth GTP-U format sent by the SGW. Optionally, after receiving the packet in the third GTP-U format sent by the PGW, the SGW decapsulates the packet in the third GTP-U format, and removes the SGW TEID, to obtain the response packet. The SGW generates the packet in the fourth GTP-U format according to the response packet. Optionally, the SGW encapsulates the response packet into the packet in the fourth GTP-U format according to the bearer context of the UE in the response packet. A GTP-U header of the packet in the fourth GTP-U format includes the TEID of the base station device of the bearer.

The MEC platform obtains the TEID of the base station device according to the packet in the fourth GTP-U format. Optionally, the traffic bus obtains the TEID of the base station device according to the packet in the fourth GTP-U format.

Manner 3

The MEC platform sends the GTP-U uplink packet to a PGW by using an SGW, and after decapsulating the GTP-U uplink packet by using the PGW, sends the decapsulated GTP-U uplink packet to a server by using the PGW, so that after generating a response packet according to the decapsulated GTP-U uplink packet, the server sends the response packet to the PGW, and the PGW sends a packet in a fifth GTP-U format to the SGW. The packet in the fifth GTP-U format includes the response packet. Optionally, the traffic bus sends the GTP-U uplink packet to the PGW by using the SGW. Optionally, after decapsulating the GTP-U uplink packet, the PGW sends the decapsulated GTP-U uplink packet to the server. Correspondingly, the server receives the decapsulated GTP-U uplink packet, and generates the response packet according to the decapsulated GTP-U uplink packet. Optionally, the response packet includes a bearer context of the UE. After receiving the response packet, the PGW encapsulates the response packet into a packet in a fifth GTP-U format according to the bearer context of the UE. The packet in the fifth GTP-U format includes an SGW TEID. The SGW TEID is used for the PGW to send the packet in the fifth GTP-U format to the SGW.

The MEC platform receives a packet in a sixth GTP-U format sent by the SGW. The packet in the sixth GTP-U format is generated by the SGW according to the packet in the fifth GTP-U format, and the packet in the sixth GTP-U format includes the response packet and the TEID of the base station device. Optionally, the traffic bus receives the packet in the sixth GTP-U format sent by the SGW. Optionally, a process in which the SGW generates the packet in the sixth GTP-U format according to the packet in the fifth GTP-U format is similar to a process in which the SGW generates the packet in the fourth GTP-U format according to the packet in the third GTP-U format in manner 2. For the process, refer to the detailed descriptions in manner 2, and details are not described herein again.

The MEC platform obtains the TEID of the base station device according to the packet in the sixth GTP-U format. Optionally, the traffic bus obtains the TEID of the base station device according to the packet in the sixth GTP-U format.

Manner 4

The MEC platform sends a bearer context request message to an SGW or a service capability open platform. The bearer context request message is used to query the SGW or the service capability open platform for the TEID of the base station device, the bearer context request message includes IP quintuple information, and a destination address in the IP quintuple information is the IP address of the UE. Optionally, the traffic bus sends the bearer context request message to the SGW or the service capability open platform. Optionally, the MEC platform may send IP quintuple information to the PGW according to the GTP-U protocol, to query for an SGW TEID, and send the bearer context request message to the SGW according to the SGW TEID. Alternatively, the MEC platform may send the bearer context request message to the SGW according to the PMIP protocol. Optionally, after receiving the bearer context request message sent by the MEC platform, the SGW or the service capability platform queries for the TEID of the base station device according to the IP quintuple information.

The MEC platform receives a bearer context response message sent by the SGW or the service capability open platform. The bearer context response message includes the TEID of the base station device, and the TEID of the base station device is obtained through querying by the SGW or the service capability open platform according to the IP quintuple information. Optionally, the traffic bus receives the bearer context response message sent by the SGW or the service capability open platform.

The MEC platform obtains the TEID of the base station device according to the bearer context response message. Optionally, the traffic bus obtains the TEID of the base station device according to the bearer context response message.

The service capability open platform used in this manner is a function entity defined in the 3GPP. The platform may collect information about each network element in a 3GPP network, for example, device information or user context information. When another entity needs to obtain the information about each network element in the 3GPP network, the other entity may obtain the information from the service capability open platform by using an application platform interface (API). The service capability open platform corresponds to a service capability exposure function in the standard defined in the 3GPP, and it may be briefly referred to as an SCEF.

In this manner, it is not required to deploy an additional server device. Therefore, an implementation is relatively simple, overheads are relatively low, and maintenance costs are relatively low.

Manner 5

The GTP-U uplink packet includes the TEID of the base station device. The MEC platform obtains the TEID of the base station device included in the GTP-U uplink packet. Optionally, the traffic bus obtains the TEID of the base station device included in the GTP-U uplink packet.

Optionally, the GTP-U downlink packet includes the downlink data packet needing to be sent to the UE. Before obtaining the TEID of the base station device according to the GTP-U uplink packet, the MEC platform further determines, according to the downlink data packet, that the TEID of the base station device is not stored. Optionally, the traffic bus further determines, according to the downlink data packet, that the TEID of the base station device is not stored.

Optionally, after obtaining the TEID of the base station device according to the GTP-U uplink packet, the MEC platform further stores the TEID of the base station device. Optionally, the traffic bus further stores the TEID of the base station device.

203. The MEC platform sends a GTP-U downlink packet to the base station device, where the GTP-U downlink packet includes the TEID of the base station device.

Optionally, the traffic bus sends the GTP-U downlink packet to the base station device.

Optionally, the GTP-U downlink packet further includes the downlink data packet needing to be sent to the UE.

Optionally, after sending the GTP-U downlink packet to the base station device, the MEC platform further receives the GTP-U uplink packet sent by the base station device, determines, according to the GTP-U uplink packet, that the TEID of the base station device is stored, and sends the GTP-U downlink packet to the base station device. The GTP-U downlink packet includes the TEID of the base station device. Optionally, the MEC platform generates the downlink data packet according to the GTP-U uplink packet, and determines, according to the downlink data packet, that the TEID of the base station device is stored.

In this embodiment, after receiving the GTP-U uplink packet sent by the base station device, the MEC platform can obtain the TEID of the base station device according to the GTP-U uplink packet, and therefore, can correctly perform GTP-U encapsulation, and send the GTP-U downlink packet to the base station device.

Further, after receiving the GTP-U uplink packet sent by the base station device, the MEC platform can determine whether the TEID of the base station device is stored, and if the TEID is not stored, store the TEID of the base station device after obtaining the TEID of the base station device, or if the TEID is stored, the MEC platform may directly perform GTP-U encapsulation and send the GTP-U downlink packet to the base station device.

The following gives a description by using an example in which an LTE system is an application scenario and a base station device is an eNodeB. In subsequent embodiments, for the convenience of description, a TEID of the base station device may be referred to as an eNodeB TEID.

Figure 3:
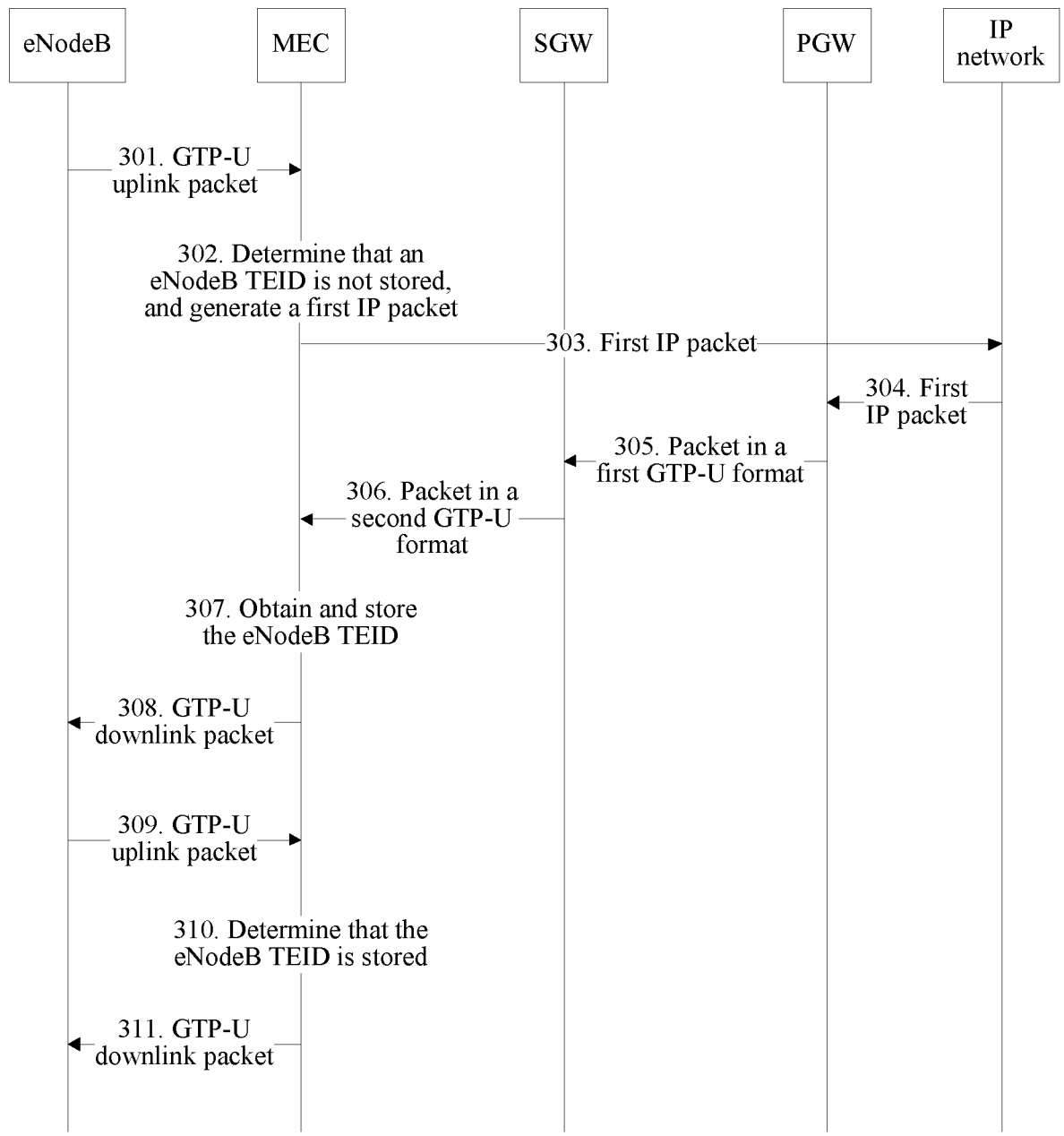
FIG. 3 is a schematic diagram of a GTP-U downlink packet sending method according to a second embodiment of the present disclosure.

FIG. 3 is a schematic diagram of a GTP-U downlink packet sending method according to a second embodiment of the present disclosure. In this embodiment, for contents similar to those in the first embodiment, refer to the detailed descriptions in the first embodiment, and details are not described herein again. As shown in FIG. 3, the method in this embodiment includes the following steps.

301. An eNodeB sends a GTP-U uplink packet to an MEC platform.

Optionally, the GTP-U uplink packet includes an uplink data packet sent by UE, and the uplink data packet includes an IP address of the UE.

302. The MEC platform receives the GTP-U uplink packet sent by the eNodeB, and after determining, according to the GTP-U uplink packet, that an eNodeB TEID is not stored, the MEC platform generates a first IP packet, where the first IP packet includes the IP address of the UE.

Optionally, the MEC platform generates, according to the GTP-U uplink packet, a downlink data packet needing to be sent to the UE, and determines, according to the downlink data packet, that the eNodeB TEID is not stored.

303. The MEC platform sends the first IP packet to an IP network.

304. Route the first IP packet to a PGW based on the IP address of the UE after the first IP packet is sent to the IP network.

305. After receiving the first IP packet, the PGW generates a packet in a first GTP-U format according to the first IP packet, and sends the packet in the first GTP-U format to an SGW.

Optionally, the first IP packet includes a bearer context of the UE. The PGW encapsulates the first IP packet into the packet in the first GTP-U format according to the bearer context of the UE. The packet in the first GTP-U format includes an SGW TEID.

306. The SGW receives the packet in the first GTP-U format sent by the PGW, generates a packet in a second GTP-U format according to the packet in the first GTP-U format, and sends the packet in the second GTP-U format to the MEC platform.

Optionally, the SGW decapsulates the packet in the first GTP-U format, and removes the SGW TEID to obtain the first IP packet, and encapsulates the first IP packet into the packet in the second GTP-U format according to the bearer context of the UE. The packet in the second GTP-U format includes the eNodeB TEID.

307. The MEC platform receives the packet in the second GTP-U format sent by the SGW, and obtains and stores the eNodeB TEID according to the packet in the second GTP-U format.

308. The MEC platform sends a GTP-U downlink packet to the eNodeB, where the GTP-U downlink packet includes the eNodeB TEID.

Optionally, the MEC platform encapsulates the downlink data packet needing to be sent to the UE into the GTP-U downlink packet.

309. The MEC platform receives the GTP-U uplink packet sent by the eNodeB.

310. The MEC platform determines, according to the GTP-U uplink packet, that the eNodeB TEID is stored.

Optionally, the MEC platform generates, according to the GTP-U uplink packet, the downlink data packet needing to be sent to the UE, and determines, according to the downlink data packet, that the eNodeB TEID is stored.

311. The MEC platform sends the GTP-U downlink packet to the eNodeB, where the GTP-U downlink packet includes the eNodeB TEID.

In this embodiment, after receiving a GTP-U uplink packet sent by a base station device, the MEC platform generates a first IP packet according to the GTP-U uplink packet, and after sending the first IP packet to an IP network, receives a packet in a GTP-U format that is sent by an SGW and that includes a TEID of the base station device, so that after obtaining the TEID of the base station device, the MEC platform sends a correctly encapsulated GTP-U downlink packet to the base station device.

Further, in the method in this embodiment, another device other than the MEC platform does not need to be upgraded, and it is not required to deploy a server device. It is compatible with an existing device. Therefore, a deployment speed is relatively fast, and costs are relatively low.

Figure 4:
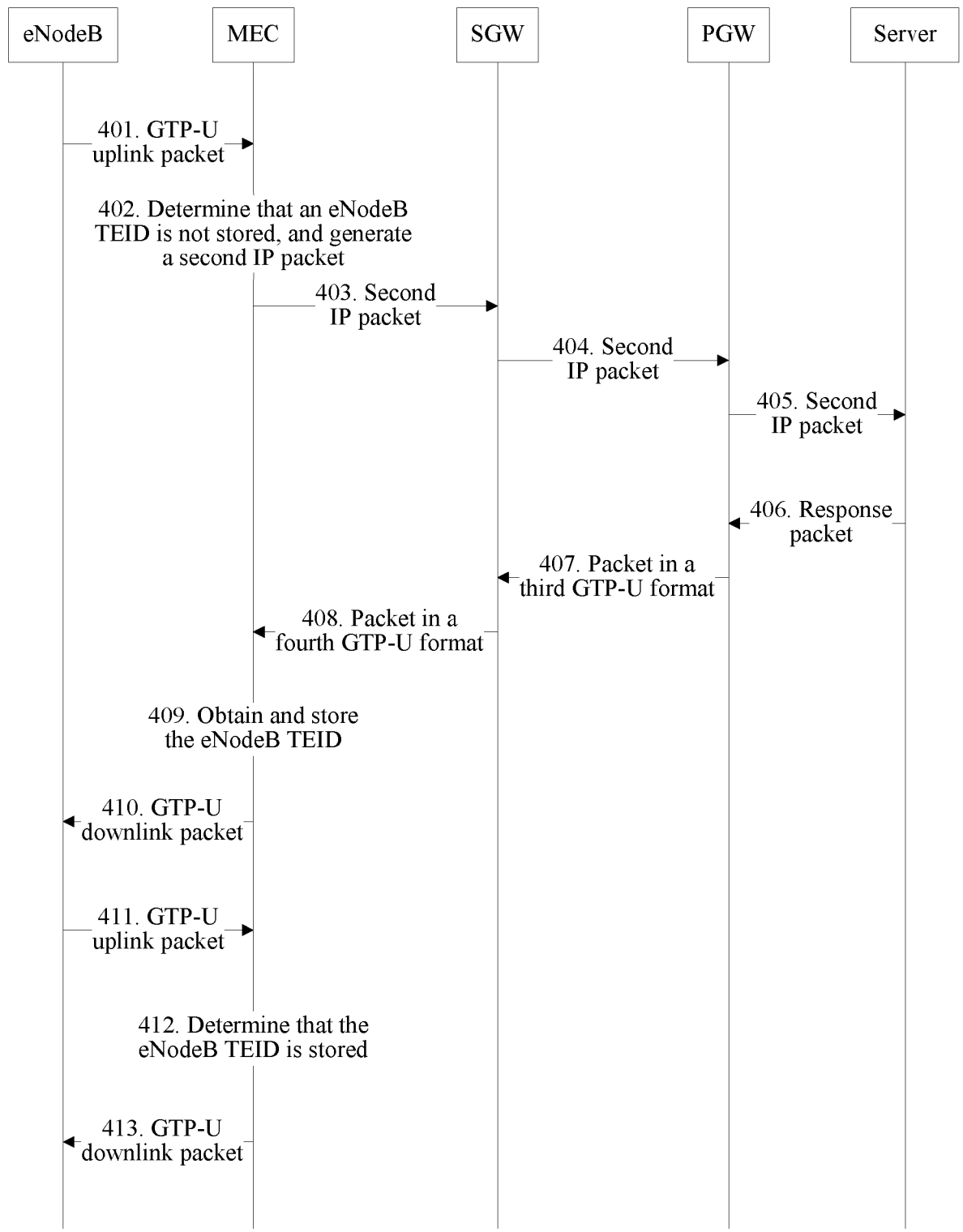
FIG. 4 is a schematic diagram of a GTP-U downlink packet sending method according to a third embodiment of the present disclosure.

FIG. 4 is a schematic diagram of a GTP-U downlink packet sending method according to a third embodiment of the present disclosure. In this embodiment, for contents similar to those in the first embodiment, refer to the detailed descriptions in the first embodiment, and details are not described herein again.

In this embodiment, step 401 and step 402 are similar to step 301 and step 302 in the second embodiment. A second IP packet in step 402 corresponds to the first IP packet in step 302, and other contents are not described herein again.

403 to 405. The MEC platform sends the second IP packet to a server by using an SGW and a PGW.

406. After generating a response packet according to the second IP packet, the server sends the response packet to the PGW, where the response packet includes an IP address of UE.

407. The PGW receives the response packet sent by the server, and after generating a packet in a third GTP-U format according to the response packet, sends the packet in the third GTP-U format to the SGW.

Optionally, the response packet includes a bearer context of the UE. The PGW encapsulates the response packet into the packet in the third GTP-U format according to the bearer context of the UE. The packet in the third GTP-U format includes an SGW TEID.

408. The SGW receives the packet in the third GTP-U format sent by the PGW, generates a packet in a fourth GTP-U format according to the packet in the third GTP-U format, and sends the packet in the fourth GTP-U format to the MEC platform.

Optionally, the SGW decapsulates the packet in the third GTP-U format, and removes the SGW TEID to obtain the response packet, and encapsulates the response packet into the packet in the fourth GTP-U format according to the bearer context of the UE. The packet in the fourth GTP-U format includes the eNodeB TEID.

409. The MEC platform receives the packet in the fourth GTP-U format sent by the SGW, and obtains and stores the eNodeB TEID according to the packet in the fourth GTP-U format.

Step 410 to step 413 are similar to step 308 to step 311 in the second embodiment, and details are not described herein again.

Figure 5:
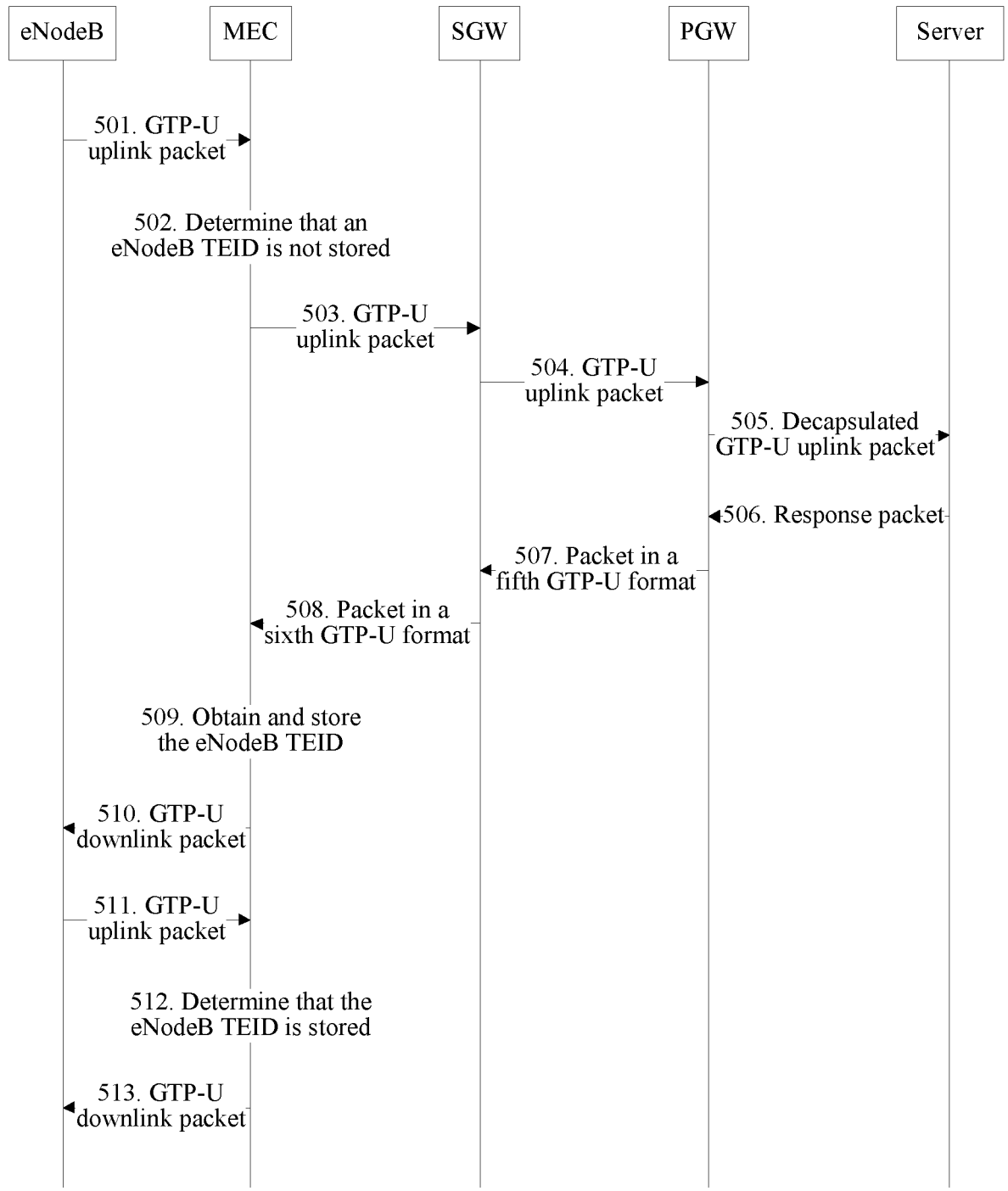
FIG. 5 is a schematic diagram of a GTP-U downlink packet sending method according to a fourth embodiment of the present disclosure.

FIG. 5 is a schematic diagram of a GTP-U downlink packet sending method according to a fourth embodiment of the present disclosure. In this embodiment, for contents similar to those in the first embodiment, refer to the detailed descriptions in the first embodiment, and details are not described herein again.

In this embodiment, step 501 is similar to step 401 in the third embodiment, and details are not described herein again.

502. After receiving the GTP-U uplink packet sent by the eNodeB, the MEC platform determines, according to the GTP-U uplink packet, that an eNodeB TEID is not stored.

Optionally, the MEC platform generates, according to the GTP-U uplink packet, a downlink data packet needing to be sent to UE, and determines, according to the downlink data packet, that the eNodeB TEID is not stored.

503 to 504. The MEC platform sends the GTP-U uplink packet to a PGW by using an SGW.

505. After receiving the GTP-U uplink packet and decapsulating the GTP-U uplink packet, the PGW sends the decapsulated GTP-U uplink packet to a server.

Step 506 to step 513 are similar to step 406 to step 413 in the third embodiment. A difference lies in that the response packet in step 406 is a response packet generated by the server according to the second IP packet, and a response packet in step 506 is a response packet generated by the server according to the decapsulated GTP-U uplink packet. Packets in a fifth GTP-U format and a sixth GTP-U format in this embodiment are respectively similar to the packets in the third GTP-U format and the fourth GTP-U format in the third embodiment, and other contents are not described herein again.

Figure 6:
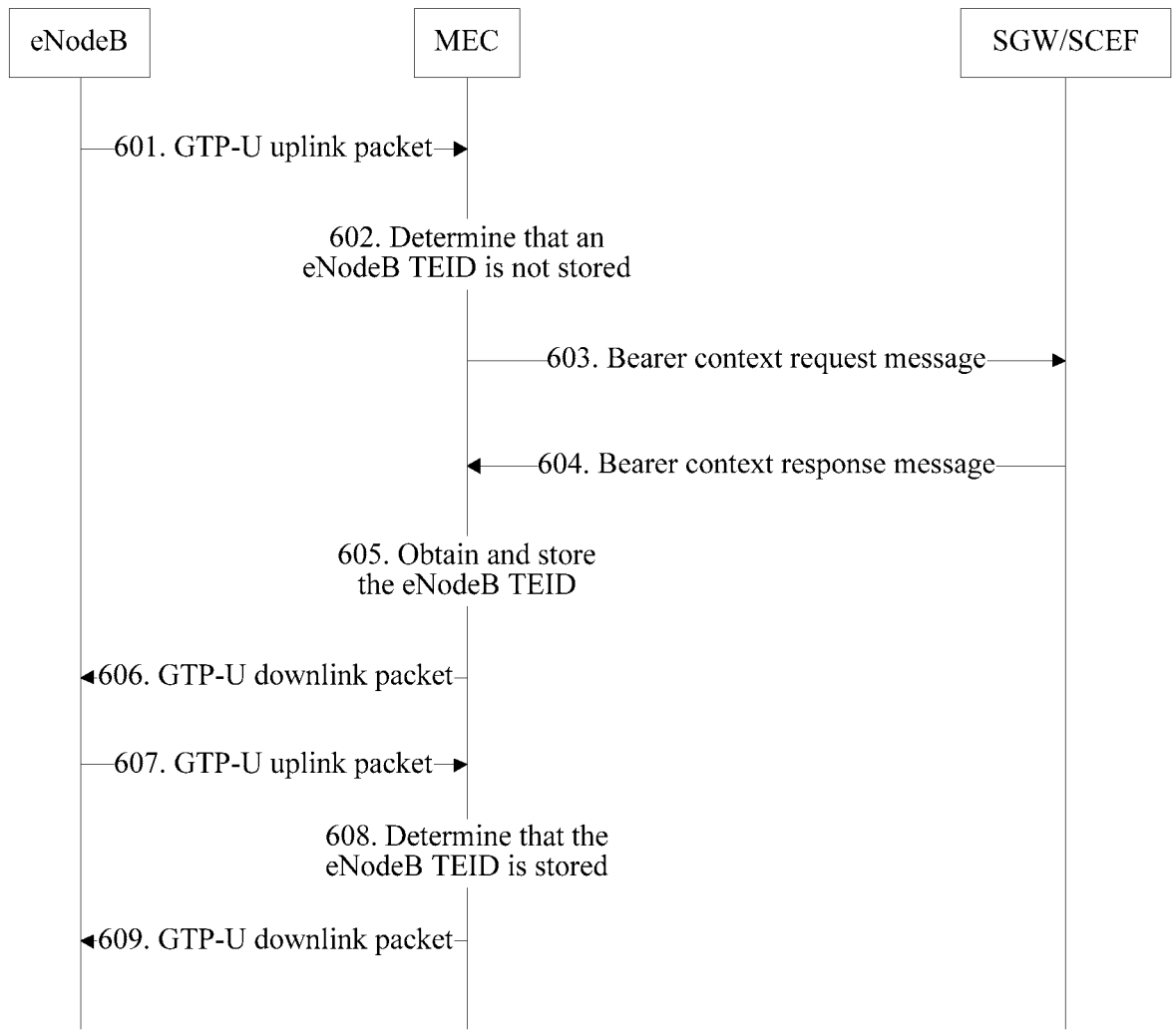
FIG. 6 is a schematic diagram of a GTP-U downlink packet sending method according to a fifth embodiment of the present disclosure.

FIG. 6 is a schematic diagram of a GTP-U downlink packet sending method according to a fifth embodiment of the present disclosure. In this embodiment, for contents similar to those in the first embodiment, refer to the detailed descriptions in the first embodiment, and details are not described herein again.

In this embodiment, step 601 and step 602 are similar to step 501 and step 502 in the fourth embodiment, and details are not described herein again.

603. The MEC platform sends a bearer context request message to an SGW or a service capability open platform, where the bearer context request message is used to query the SGW or the service capability open platform for the eNodeB TEID, the bearer context request message includes IP quintuple information, and a destination address in the IP quintuple information is an IP address of UE.

604. After receiving the bearer context request message sent by the MEC platform, the SGW or the service capability open platform queries for the eNodeB TEID according to the IP quintuple information, and the SGW or the service capability open platform sends a bearer context response message to the MEC platform, where the bearer context response message includes the eNodeB TEID.

Step 605 to step 609 are similar to step 509 to step 513 in the fourth embodiment, and details are not described herein again.

In this embodiment, the MEC platform sends the bearer context request message including the IP quintuple information to the SGW or the service capability open platform, to obtain the TEID of the base station device that is obtained through querying by the SGW or the service capability open platform according to the IP quintuple information, and send a correctly encapsulated GTP-U downlink packet to the base station device.

Further, in the method in this embodiment, it is not required to deploy an additional server device. Therefore, an implementation is relatively simple, overheads are relatively low, and maintenance costs are relatively low.

Figure 7:
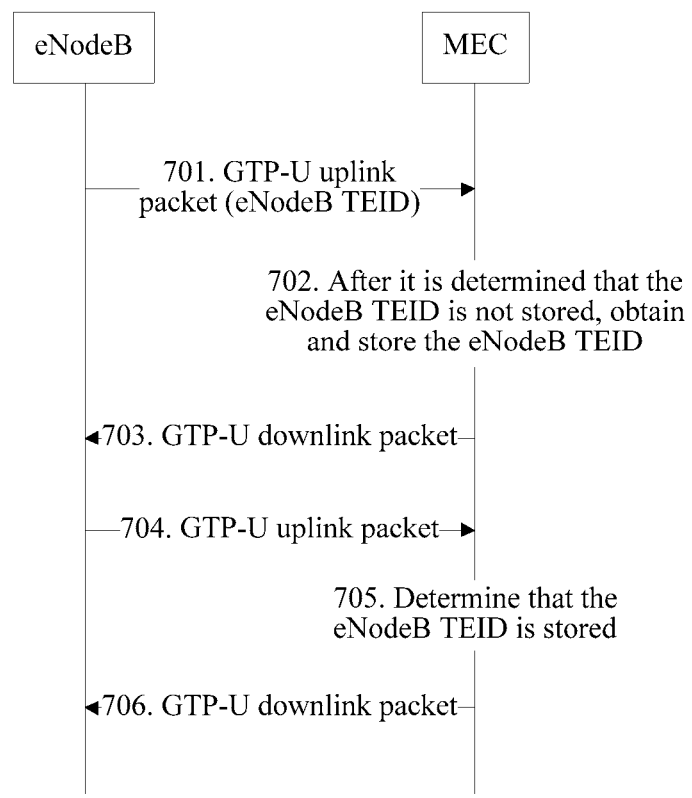
FIG. 7 is a schematic diagram of a GTP-U downlink packet sending method according to a sixth embodiment of the present disclosure.

FIG. 7 is a schematic diagram of a GTP-U downlink packet sending method according to a sixth embodiment of the present disclosure. In this embodiment, for contents similar to those in the first embodiment, refer to the detailed descriptions in the first embodiment, and details are not described herein again. The method in this embodiment includes the following steps.

701. An eNodeB sends a GTP-U uplink packet to an MEC platform, where the GTP-U uplink packet includes an eNodeB TEID.

702. After determining, according to the GTP-U uplink packet, that the eNodeB TEID is not stored, the MEC platform obtains and stores the eNodeB TEID.

Optionally, the MEC platform generates, according to the GTP-U uplink packet, a downlink data packet needing to be sent to UE, and determines, according to the downlink data packet, that the eNodeB TEID is not stored.

Step 703 to step 706 are similar to step 606 to step 609 in the fifth embodiment, and details are not described herein again.

Figure 8:
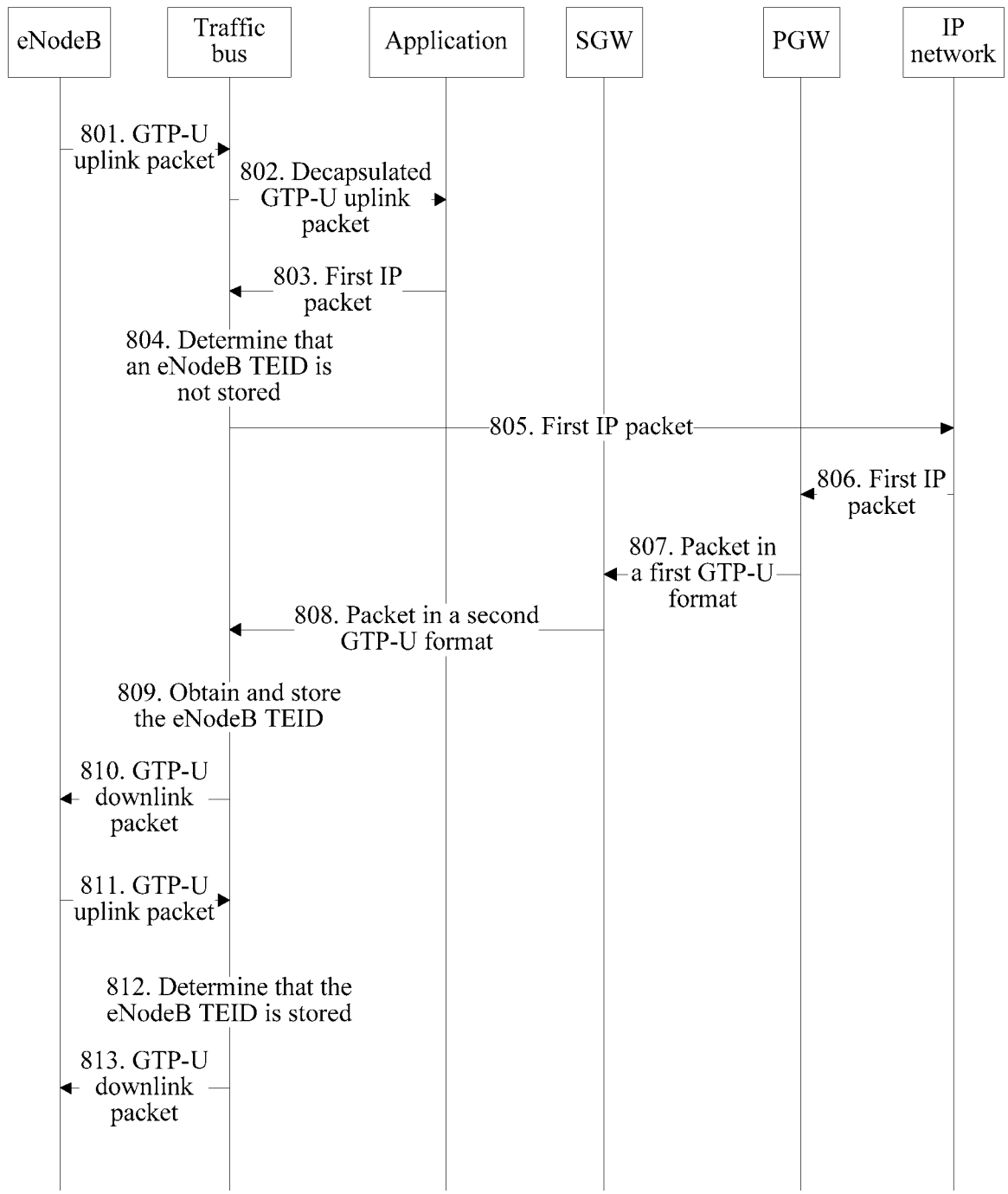
FIG. 8 is a schematic diagram of a GTP-U downlink packet sending method according to a seventh embodiment of the present disclosure.

FIG. 8 is a schematic diagram of a GTP-U downlink packet sending method according to a seventh embodiment of the present disclosure. Based on the second embodiment, this embodiment is described by using an example in which an MEC platform includes a traffic bus and an application. In this embodiment, for contents similar to those in the first embodiment and the second embodiment, refer to the detailed descriptions in the first embodiment and the second embodiment, and details are not described herein again.

In this embodiment, step 801, and step 805 to step 813 are similar to step 301, and step 303 to step 311 in the second embodiment. A traffic bus in step 801, and step 805 to step 813 correspond to the MEC platform in step 301, and step 303 to step 311, and other contents are not described herein again.

Step 302 in the second embodiment corresponds to the following three steps in this embodiment.

802. After receiving the GTP-U uplink packet, the traffic bus decapsulates the GTP-U uplink packet, and sends the decapsulated GTP-U uplink packet to an application.

803. The application generates a first IP packet according to the decapsulated GTP-U uplink packet, and sends the first IP packet to the traffic bus.

804. The traffic bus receives the first IP packet sent by the application, and determines, according to the first IP packet, that the eNodeB TEID is not stored.

Similarly, based on the third embodiment to the sixth embodiment, the MEC platform may further include the traffic bus and the application. Step 402, step 502, step 602, and step 702 in the third embodiment to the sixth embodiment may correspond to the step 802 to step 804 of interaction between the traffic bus and the application in the seventh embodiment. Steps of the MEC platform in the other steps in the third embodiment to the sixth embodiment are implemented by the traffic bus, and other contents are not described herein again.

Figure 9:
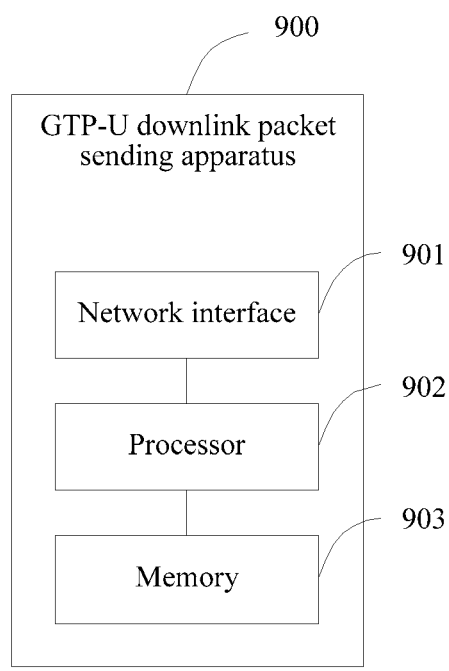
FIG. 9 is a schematic diagram of a GTP-U downlink packet sending apparatus according to an eighth embodiment of the present disclosure.

FIG. 9 is a schematic diagram of a GTP-U downlink packet sending apparatus according to an eighth embodiment of the present disclosure. In this embodiment, for contents similar to those in the first embodiment to the seventh embodiment, refer to the detailed descriptions in the first embodiment to the seventh embodiment, and details are not described herein again. In this embodiment, the GTP-U downlink packet sending apparatus 900 includes a network interface 901 and a processor 902.

The network interface 901 is configured to receive a GTP-U uplink packet sent by a base station device, and configured to send a GTP-U downlink packet to the base station device, where the GTP-U downlink packet includes a TEID of the base station device.

Optionally, the network interface 901 is configured to: after the processor 902 generates a first IP packet, send the first IP packet to an IP network, where after the first IP packet is sent to the IP network, the first IP packet is routed to a packet data gateway PGW based on an IP address of UE, so that the PGW sends a packet in a first GTP-U format to a serving gateway SGW, where the packet in the first GTP-U format includes the first IP packet.

Optionally, the network interface 901 is further configured to: after sending the first IP packet to the IP network, receive a packet in a second GTP-U format sent by the SGW. The packet in the second GTP-U format is generated by the SGW according to the packet in the first GTP-U format, and the packet in the second GTP-U format includes the first IP packet and the TEID of the base station device.

Optionally, the network interface 901 is configured to: after the processor 902 generates a second IP packet, send the second IP packet to a server by using an SGW and a PGW, so that after generating a response packet according to the second IP packet, the server sends the response packet to the PGW, and the PGW sends a packet in a third GTP-U format to the SGW, where the packet in the third GTP-U format includes the response packet.

Optionally, the network interface 901 is further configured to: after sending the second IP packet to the server by using the SGW and the PGW, receive a packet in a fourth GTP-U format sent by the SGW, where the packet in the fourth GTP-U format is generated by the SGW according to the packet in the third GTP-U format, and the packet in the fourth GTP-U format includes the response packet and the TEID of the base station device.

Optionally, the network interface 901 is configured to: after receiving the GTP-U uplink packet sent by the base station device, send the GTP-U uplink packet to a PGW by using an SGW, and after decapsulating the GTP-U uplink packet by using the PGW, send the decapsulated GTP-U uplink packet to a server by using the PGW, so that after generating a response packet according to the decapsulated GTP-U uplink packet, the server sends the response packet to the PGW, and the PGW sends a packet in a fifth GTP-U format to the SGW, where the packet in the fifth GTP-U format includes the response packet.

Optionally, the network interface 901 is further configured to: after sending the GTP-U uplink packet to the PGW by using the SGW, receive a packet in a sixth GTP-U format sent by the SGW, where the packet in the sixth GTP-U format is generated by the SGW according to the packet in the fifth GTP-U format, and the packet in the sixth GTP-U format includes the response packet and the TEID of the base station device.

Optionally, the network interface 901 is configured to: after receiving the GTP-U uplink packet sent by the base station device, send a bearer context request message to an SGW or a service capability open platform, where the bearer context request message is used to query the SGW or the service capability open platform for the TEID of the base station device, the bearer context request message includes IP quintuple information, and a destination address in the IP quintuple information is the IP address of the UE.

Optionally, the network interface 901 is further configured to: after sending the bearer context request message to the SGW or the service capability open platform, receive a bearer context response message sent by the SGW or the service capability open platform, where the bearer context response message includes the TEID of the base station device, and the TEID of the base station device is obtained through querying by the SGW or the service capability open platform according to the IP quintuple information.

Optionally, the network interface 901 is specifically configured to receive the GTP-U uplink packet that is sent by the base station device and that includes the TEID of the base station device.

Optionally, the network interface 901 is further configured to: after sending the GTP-U downlink packet to the base station device, receive the GTP-U uplink packet sent by the base station device.

Optionally, the network interface 901 is further configured to: after the processor 902 determines that the TEID of the base station device is stored, send the GTP-U downlink packet to the base station device, where the GTP-U downlink packet includes the TEID of the base station device.

The processor 902 is configured to obtain the TEID of the base station device according to the GTP-U uplink packet.

Optionally, the processor 902 is further configured to: after the network interface 901 receives the GTP-U uplink packet sent by the base station device, generate the first IP packet according to the GTP-U uplink packet, where the first IP packet includes the IP address of the UE. Optionally, the processor 902 is configured to decapsulate the GTP-U uplink packet, and specifically configured to generate the first IP packet according to the decapsulated GTP-U uplink packet.

Optionally, the processor 902 is specifically configured to: after the network interface 901 receives the packet in the second GTP-U format sent by the SGW, obtain the TEID of the base station device according to the packet in the second GTP-U format.

Optionally, the processor 902 is further configured to: after the network interface 901 receives the GTP-U uplink packet sent by the base station device, generate the second IP packet according to the GTP-U uplink packet, where the second IP packet includes the IP address of the UE. Optionally, the processor 902 is configured to decapsulate the GTP-U uplink packet; and specifically configured to generate the second IP packet according to the decapsulated GTP-U uplink packet.

Optionally, the processor 902 is specifically configured to: after the network interface 901 receives the packet in the fourth GTP-U format sent by the SGW, obtain the TEID of the base station device according to the packet in the fourth GTP-U format.

Optionally, the processor 902 is specifically configured to: after the network interface 901 receives the packet in the sixth GTP-U format sent by the SGW, obtain the TEID of the base station device according to the packet in the sixth GTP-U format.

Optionally, the processor 902 is specifically configured to: after the network interface 901 receives the bearer context response message sent by the SGW or the service capability open platform, obtain the TEID of the base station device according to the bearer context response message.

Optionally, the processor 902 is specifically configured to: after the network interface 901 receives the GTP-U uplink packet that is sent by the base station device and that includes the TEID of the base station device, obtain the TEID of the base station device included in the GTP-U uplink packet.

Optionally, the processor 902 is further configured to: after the network interface 901 receives the GTP-U uplink packet sent by the base station device, generate, according to the GTP-U uplink packet, a downlink data packet needing to be sent to the UE. Optionally, the processor 902 is further configured to decapsulate the GTP-U uplink packet; and specifically configured to generate the downlink data packet according to the decapsulated GTP-U uplink packet.

Optionally, the processor 902 is further configured to: before obtaining the TEID of the base station device according to the GTP-U uplink packet, determine, according to the downlink data packet, that the TEID of the base station device is not stored.

Optionally, the processor 902 is further configured to: after obtaining the TEID of the base station device according to the GTP-U uplink packet, store the TEID of the base station device.

Optionally, the processor 902 is further configured to: after the network interface 901 receives the GTP-U uplink packet sent by the base station device, determine, according to the GTP-U uplink packet, that the TEID of the base station device is stored. Optionally, the processor is specifically configured to: generate the downlink data packet according to the GTP-U uplink packet, and determine, according to the downlink data packet, that the TEID of the base station device is stored.

Optionally, the network interface 901 is configured to perform a signal receiving process and a signal sending process of the MEC platform in the methods shown in FIG. 2 to FIG. 8, and the processor 902 is configured to perform a signal processing process of the MEC platform in the methods shown in FIG. 2 to FIG. 8.

Further, the apparatus 900 in this embodiment may further include a memory 903. The memory 903 is configured to store a processor executable instruction. The instruction stored in the memory 903 may enable the processor 902 to perform the methods in FIG. 2 to FIG. 8. For example:

The processor executable instruction stored in the memory 903 enables the processor 902 to perform the following operations: receiving the GTP-U uplink packet sent by the base station device; obtaining the TEID of the base station device according to the GTP-U uplink packet; and sending the GTP-U downlink packet to the base station device, where the GTP-U downlink packet includes the TEID of the base station device.

Optionally, an embodiment of the present disclosure further provides a computer storage medium or a computer program product, configured to store the processor executable instruction stored in the memory 903.

Optionally, the memory may be a storage unit, and the processor may be a processing unit.

In this embodiment, after receiving the GTP-U uplink packet sent by the base station device, the apparatus can obtain the TEID of the base station device according to the GTP-U uplink packet, and therefore, can correctly perform GTP-U encapsulation, and send the GTP-U downlink packet to the base station device.

Further, in this embodiment, after receiving the GTP-U uplink packet sent by the base station device, the apparatus can determine whether the TEID of the base station device is stored, and if the TEID is not stored, store the TEID of the base station device after obtaining the TEID of the base station device, or if the TEID is stored, the apparatus may directly perform GTP-U encapsulation and send the GTP-U downlink packet to the base station device.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A general packet radio system (GPRS) tunneling protocol-user plane (GTP-U) downlink packet sending method, comprising:
receiving, by a mobile edge computing (MEC) platform, a GTP-U uplink packet sent by a base station device;
obtaining, by the MEC platform, a tunneling endpoint identifier (TEID) of the base station device according to the GTP-U uplink packet, wherein the obtaining the TEID comprises obtaining, by the MEC platform, the TEID of the base station device according to a second packet sent to the MEC by a serving gateway (SGW) in response to first packet sent to the SGW according to the GTP-U uplink packet; and sending, by the MEC platform, a GTP-U downlink packet to the base station device, wherein the GTP-U downlink packet comprises the TEID of the base station device;

wherein the obtaining, by the MEC platform, a TEID of the base station device according to the GTP-U uplink packet comprises performing one of a first process, a second process, a third process, or a fourth process;

wherein the first process comprises:
  generating, by the MEC platform, a first Internet Protocol (IP) packet according to the GTP-U uplink packet, wherein the GTP-U uplink packet comprises an IP address of user equipment, and wherein the first IP packet comprises the IP address of the user equipment,
  sending, by the MEC platform, the first IP packet to an IP network, wherein after the first IP packet is sent to the IP network, the first IP packet is routed to a packet data network gateway (PGW) based on the IP address of the user equipment, so that the PGW sends a packet in a first GTP-U format to the SGW, and the packet in the first GTP-U format comprises the first IP packet,
  receiving, by the MEC platform, a packet in a second GTP-U format sent by the SGW, wherein the packet in the second GTP-U format is generated by the SGW according to the packet in the first GTP-U format, and the packet in the second GTP-U format comprises the first IP packet and the TEID of the base station device, and
  obtaining, by the MEC platform, the TEID of the base station device according to the packet in the second GTP-U format;

wherein the second process comprises:
  generating, by the MEC platform, a second IP packet according to the GTP-U uplink packet, wherein the GTP-U uplink packet comprises an IP address of user equipment, and, wherein the second IP packet comprises the IP address of the user equipment,
  sending, by the MEC platform, the second IP packet to a server via the SGW and the PGW, so that after generating a response packet according to the second IP packet, the server sends the response packet to the PGW, and the PGW sends a packet in a third GTP-U format to the SGW, wherein the packet in the third GTP-U format comprises the response packet,
  receiving, by the MEC platform, a packet in a fourth GTP-U format sent by the SGW, wherein the packet in the fourth GTP-U format is generated by the SGW according to the packet in the third GTP-U format, and the packet in the fourth GTP-U format comprises the response packet and the TEID of the base station device, and
  obtaining, by the MEC platform, the TEID of the base station device according to the packet in the fourth GTP-U format;

wherein the third process comprises:
  sending, by the MEC platform, the GTP-U uplink packet to the PGW via the SGW, and after decapsulating the GTP-U uplink packet by using the PGW, sending the decapsulated GTP-U uplink packet to a server by using the PGW, so that after generating a response packet according to the decapsulated GTP-U uplink packet, the server sends the response packet to the PGW, and the PGW sends a packet in a fifth GTP-U format to the SGW, wherein the packet in the fifth GTP-U format comprises the response packet;
  receiving, by the MEC platform, a packet in a sixth GTP-U format sent by the SGW, wherein the packet in the sixth GTP-U format is generated by the SGW according to the packet in the fifth GTP-U format, and the packet in the sixth GTP-U format comprises the response packet and the TEID of the base station device; and
  obtaining, by the MEC platform, the TEID of the base station device according to the packet in the sixth GTP-U format; and wherein the fourth process comprises:
  sending, by the MEC platform, a bearer context request message to the SGW or a service capability open platform for querying the SGW or the service capability open platform for the TEID of the base station device, wherein the GTP-U uplink packet comprises an IP address of user equipment, and wherein the bearer context request message comprises IP quintuple information, and a destination address in the IP quintuple information is the IP address of the user equipment;
  receiving, by the MEC platform, a bearer context response message sent by the SGW or the service capability open platform, wherein the bearer context response message comprises the TEID of the base station device; and
  obtaining, by the MEC platform, the TEID of the base station device according to the bearer context response message.

2. The method according to claim 1, wherein:
the MEC platform comprises an application; and
generating, by the MEC platform, the first IP packet according to the GTP-U uplink packet comprises:
  generating, by the application, the first IP packet according to the GTP-U uplink packet.

3. The method according to claim 2, wherein:
the MEC platform further comprises a traffic bus;
generating, by the MEC platform, the first IP packet according to the GTP-U uplink packet comprises:
  after decapsulating the GTP-U uplink packet, sending, by the traffic bus, the decapsulated GTP-U uplink packet to the application, and
  generating, by the application, the first IP packet according to the decapsulated GTP-U uplink packet;
sending, by the MEC platform, the first IP packet to an IP network comprises:
  sending, by the traffic bus, the first IP packet to the IP network;
receiving, by the MEC platform, a packet in a second GTP-U format sent by the SGW comprises:
  receiving, by the traffic bus, the packet in the second GTP-U format sent by the SGW; and
  obtaining, by the MEC platform, the TEID of the base station device according to the packet in the second GTP-U format comprises:
  obtaining, by the traffic bus, the TEID of the base station device according to the packet in the second GTP-U format.

4. A general packet radio system (GPRS) tunneling protocol user plane (GTP-U) downlink packet sending apparatus, comprising:
a network interface configured to receive a GTP-U uplink packet sent by a base station device;

a processor configured to obtain a tunneling endpoint identifier (TEID) of the base station device according to the GTP-U uplink packet, wherein the processor is configured to obtain the TEID by obtaining the TEID of the base station device according to a second packet sent to the apparatus by a serving gateway (SGW) in response to first packet sent to the SGW according to the GTP-U uplink packet;

wherein the network interface is further configured to send a GTP-U downlink packet to the base station device, wherein the GTP-U downlink packet comprises the TEID of the base station device; and wherein the processor is configured to obtain the TEID of the base station device according to the GTP-U uplink packet by performing one of a first process, a second process, a third process, or a fourth process;

wherein the first process comprises:
generating a first Internet Protocol (IP) packet according to the GTP-U uplink packet, wherein the GTP-U uplink packet comprises an IP address of user equipment, and wherein the first IP packet comprises the IP address of the user equipment,
causing the network interface to send the first IP packet to an IP network, wherein after the first IP packet is sent to the IP network, the first IP packet is routed to a packet data network gateway (PGW) based on the IP address of the user equipment, so that the PGW sends a packet in a first GTP-U format to the SGW, and the packet in the first GTP-U format comprises the first IP packet,
receiving, through the network interface, a packet in a second GTP-U format sent by the SGW, wherein the packet in the second GTP-U format is generated by the SGW according to the packet in the first GTP-U format, and the packet in the second GTP-U format comprises the first IP packet and the TEID of the base station device, and
obtaining the TEID of the base station device according to the packet in the second GTP-U format;

wherein the second process comprises:
generating a second IP packet according to the GTP-U uplink packet, wherein the GTP-U uplink packet comprises an IP address of user equipment, and, wherein the second IP packet comprises the IP address of the user equipment,
causing the network interface to send the second IP packet to a server via the SGW and the PGW, so that after generating a response packet according to the second IP packet, the server sends the response packet to the PGW, and the PGW sends a packet in a third GTP-U format to the SGW, wherein the packet in the third GTP-U format comprises the response packet,
receiving, through the network interface, a packet in a fourth GTP-U format sent by the SGW, wherein the packet in the fourth GTP-U format is generated by the SGW according to the packet in the third GTP-U format, and the packet in the fourth GTP-U format comprises the response packet and the TEID of the base station device, and
obtaining the TEID of the base station device according to the packet in the fourth GTP-U format;

wherein the third process comprises:
causing the network interface to send the GTP-U uplink packet to the PGW via the SGW, and after decapsulating the GTP-U uplink packet by using the PGW, sending the decapsulated GTP-U uplink packet to a server by using the PGW, so that after generating a response packet according to the decapsulated GTP-U uplink packet, the server sends the response packet to the PGW, and the PGW sends a packet in a fifth GTP-U format to the SGW, wherein the packet in the fifth GTP-U format comprises the response packet;
receiving, through the network interface, a packet in a sixth GTP-U format sent by the SGW, wherein the packet in the sixth GTP-U format is generated by the SGW according to the packet in the fifth GTP-U format, and the packet in the sixth GTP-U format comprises the response packet and the TEID of the base station device; and
obtaining the TEID of the base station device according to the packet in the sixth GTP-U format; and wherein the fourth process comprises:
causing the network interface to send a bearer context request message to the SGW or a service capability open platform for querying the SGW or the service capability open platform for the TEID of the base station device, wherein the GTP-U uplink packet comprises an IP address of user equipment, and wherein the bearer context request message comprises IP quintuple information, and a destination address in the IP quintuple information is the IP address of the user equipment;
receiving, through the network interface, a bearer context response message sent by the SGW or the service capability open platform, wherein the bearer context response message comprises the TEID of the base station device; and
obtaining the TEID of the base station device according to the bearer context response message.

5. The apparatus according to claim 4, wherein the processor is further configured to:
decapsulate the GTP-U uplink packet; and
generate the first IP packet according to the decapsulated GTP-U uplink packet.

6. An apparatus, comprising:
a network interface;
a processor; and
a non-transitory computer-readable storage medium storing a program to be executed by the processor, the program including instructions for:
receiving, through the network interface, a GTP-U uplink packet sent by abase station device;
obtaining a tunneling endpoint identifier (TEID) of the base station device according to the GTP-U uplink packet, wherein the obtaining the TEID comprises obtaining the TEID of the base station device according to a second packet sent by a serving gateway (SGW) in response to first packet sent to the SGW according to the GTP-U uplink packet; and
causing the network interface to send a GTP-U downlink packet to the base station device, wherein the GTP-U downlink packet comprises the TEID of the base station device;
wherein the obtaining the TEID of the base station device according to the GTP-U uplink packet comprises performing one of a first process, a second process, a third process, or a fourth process;
wherein the first process comprises:
generating a first Internet Protocol (IP) packet according to the GTP-U uplink packet, wherein the GTP-U uplink packet comprises an IP address of user equipment, and wherein the first IP packet comprises the IP address of the user equipment, causing the network interface to send the first IP packet to an IP network, wherein after the first IP packet is sent to the IP network, the first IP packet is routed to a packet data network gateway (PGW) based on the IP address of the user equipment, so that the PGW sends a packet in a first GTP-U format to the SGW, and the packet in the first GTP-U format comprises the first IP packet, receiving, through the network interface, a packet in a second GTP-U format sent by the SGW, wherein the packet in the second GTP-U format is generated by the SGW according to the packet in the first GTP-U format, and the packet in the second GTP-U format comprises the first IP packet and the TEID of the base station device, and obtaining the TEID of the base station device according to the packet in the second GTP-U format;

wherein the second process comprises:

generating a second IP packet according to the GTP-U uplink packet, wherein the GTP-U uplink packet comprises an IP address of user equipment, and, wherein the second IP packet comprises the IP address of the user equipment, causing the network interface to send the second IP packet to a server via the SGW and the PGW, so that after generating a response packet according to the second IP packet, the server sends the response packet to the PGW, and the PGW sends a packet in a third GTP-U format to the SGW, wherein the packet in the third GTP-U format comprises the response packet, receiving, through the network interface, a packet in a fourth GTP-U format sent by the SGW, wherein the packet in the fourth GTP-U format is generated by the SGW according to the packet in the third GTP-U format, and the packet in the fourth GTP-U format comprises the response packet and the TEID of the base station device, and obtaining the TEID of the base station device according to the packet in the fourth GTP-U format;

wherein the third process comprises:

causing the network interface to send the GTP-U uplink packet to the PGW via the SGW, and after decapsulating the GTP-U uplink packet by using the PGW, sending the decapsulated GTP-U uplink packet to a server by using the PGW, so that after generating a response packet according to the decapsulated GTP-U uplink packet, the server sends the response packet to the PGW, and the PGW sends a packet in a fifth GTP-U format to the SGW, wherein the packet in the fifth GTP-U format comprises the response packet;

receiving, through the network interface, a packet in a sixth GTP-U format sent by the SGW, wherein the packet in the sixth GTP-U format is generated by the SGW according to the packet in the fifth GTP-U format, and the packet in the sixth GTP-U format comprises the response packet and the TEID of the base station device; and obtaining the TEID of the base station device according to the packet in the sixth GTP-U format; and wherein the fourth process comprises:

causing the network interface to send a bearer context request message to the SGW or a service capability open platform for querying the SGW or the service capability open platform for the TEID of the base station device, wherein the GTP-U uplink packet comprises an IP address of user equipment, and wherein the bearer context request message comprises IP quintuple information, and a destination address in the IP quintuple information is the IP address of the user equipment;

receiving, through the network interface, a bearer context response message sent by the SGW or the service capability open platform, wherein the bearer context response message comprises the TEID of the base station device; and obtaining the TEID of the base station device according to the bearer context response message.

7. The apparatus according to claim 6, wherein the program further includes instructions for generating by, an application, the first IP packet according to the GTP-U uplink packet.

8. The apparatus according to claim 6, wherein the program further includes instructions for:

decapsulating the GTP-U uplink packet; and generating the first IP packet according to the decapsulated GTP-U uplink packet.

* * * * *